Figure 1:
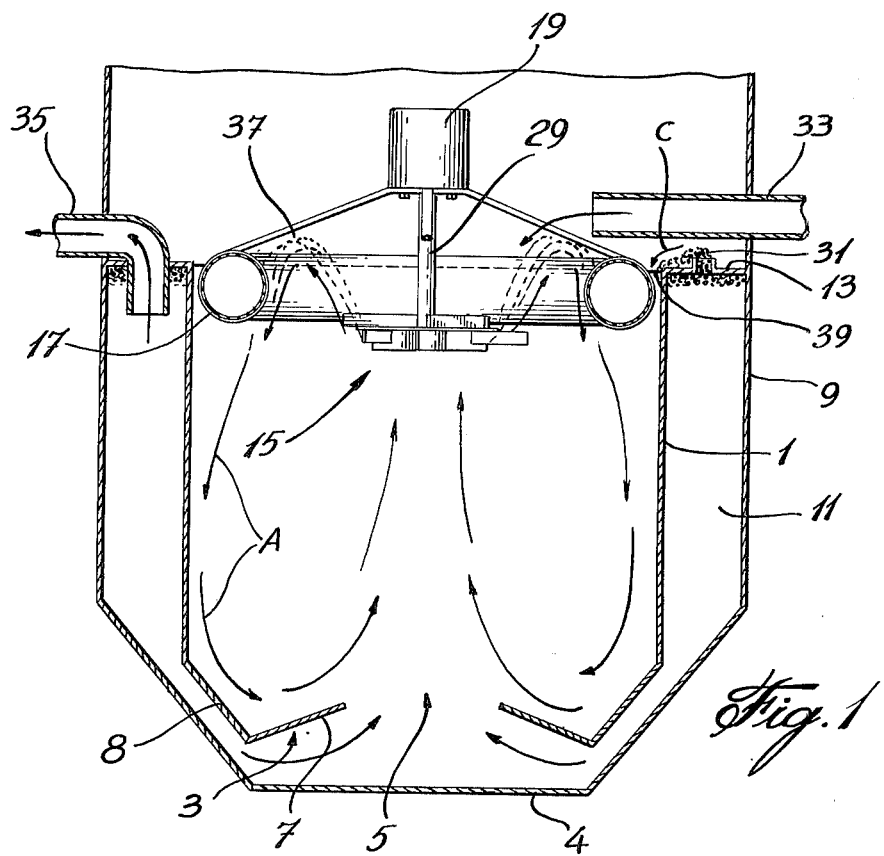

United States Patent [19]
Pacaud

[11] 3,936,381
[45] Feb. 3, 1976

[54] SEWAGE TREATMENT APPARATUS

[76] Inventor: Jean Pacaud, Saint-Genies, Bellevue, 31240 L'Union, France

[22] Filed: July 22, 1974

[21] Appl. No.: 490,872

[52] U.S. Cl............. 210/195 R; 210/219; 210/220; 210/242 A; 261/77
[51] Int. Cl.² ......................... C02C 5/04; B01F 3/04
[58] Field of Search .................................. 209/169; 210/4–7, 14, 15, 63, 195, 208, 218–221, 256, 260, 261, 525; 261/91, 77; 415/98; 416/189

[56] References Cited
UNITED STATES PATENTS

| | | | |
|---|---|---|---|
| 272,595 | 2/1883 | Smith.................................... | 415/98 |
| 480,473 | 8/1892 | Menge................................... | 415/98 |
| 850,976 | 4/1907 | Shelton................................. | 415/98 |
| 3,360,460 | 12/1967 | Weston............................. | 261/91 X |
| 3,437,212 | 4/1969 | Thorn et al. .......................... | 210/525 |
| 3,515,375 | 6/1970 | Roos................................ | 210/242 X |
| 3,573,203 | 3/1971 | Kaelin............................... | 261/91 X |
| 3,618,779 | 11/1971 | Goodman ....................... | 210/525 X |
| 3,753,897 | 8/1973 | Lin et al. ........................ | 210/256 X |

Primary Examiner—Charles N. Hart
Assistant Examiner—Robert H. Spitzer
Attorney, Agent, or Firm—Raymond A. Robic; Arthur Schwartz

[57] ABSTRACT

Domestic sewage water treatment apparatus, comprising an outer tank and an inner tank installed within the outer tank, the bottom of the inner tank being distant from the bottom of the outer tank. A space is formed between the vertical wall of the outer tank and the vertical wall of the inner tank. Means provided at the bottom of the inner tank prevent light particles from ascending into the clarification tank. Means provided at the top of the inner tank create a sufficient upwards suction thus providing the homogenization, aeration and recirculation of the bath and of the activated sludge contained in the aeration tank. Floating means are provided at the top of the inner tank for acting as a protection rampart against the turmoil created by the aeration, homogenization and recirculation means. Means are provided at the top of the space between the vertical wall of the outer tank and the vertical wall of the inner tank for trapping the light floating materials collected at the top of the space and evacuating these floating materials from the top of the space.

15 Claims, 5 Drawing Figures

U.S. Patent   February 3, 1976   Sheet 1 of 2   3,936,381

SEWAGE TREATMENT APPARATUS

The present invention relates to an apparatus for the treatment of sewage water.

Particularly, the present invention relates to an apparatus for the treatment of domestic type sewage water or a bio-degradable effluent and for the purification of these waters in the biological sense of the term with an output or efficiency of more than 90%.

In the prior art, the form of the lower part or bottom of the activation tank is such that a part of the light suspension particles pass and ascend into the clarification tank, these particles or the like being either carried along in the discharge thus raising the B.O.D. (biological oxygen demand) or are stagnant on the surface of the clarification tank and therefore become the center of bad smell by aerobic digestion.

On the other hand, the movement created by the aeration turbine promotes, either by propulsion or on the contrary by an absence of suction and therefore by an absence of recirculation, the evacuation of the waste or of the activated sludge into the clarification tank.

The present invention overcomes the above drawbacks.

One object of the present invention is the form of the lower part or bottom of the aeration tank which prevents the passing and the ascension of light particles into the clarification tank.

A further object of the invention is the provision of an aeration system which provides a sufficient upwards suction of the water bath contained in the aeration tank for homogenizing, aerating and recirculating the sludges.

A further object of the invention is the provision of means closing the upper end of the clarification tank for permitting the trapping of the fines or the like light particles in suspension which may be formed in the clarification tank.

A further object of the present invention is the provision of nozzles provided in the closing means for permitting the evacuation of the fines or the like light particles collected at the upper part of the clarification tank.

A further object of the present invention is the provision of a floating member which acts as a rampart or dam for the turmoil created by the aeration system.

Figure 2:
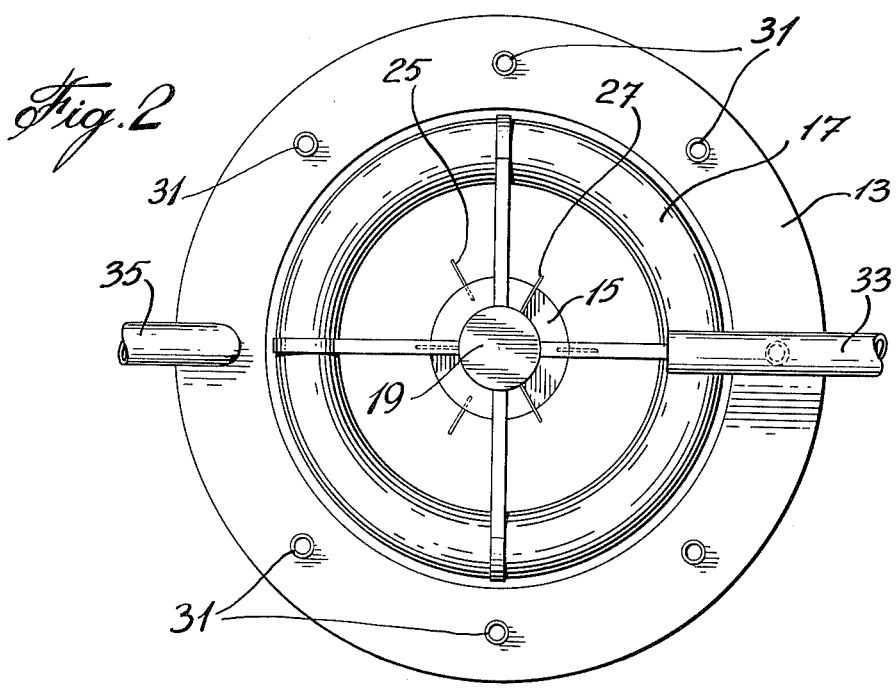
Figure 3:
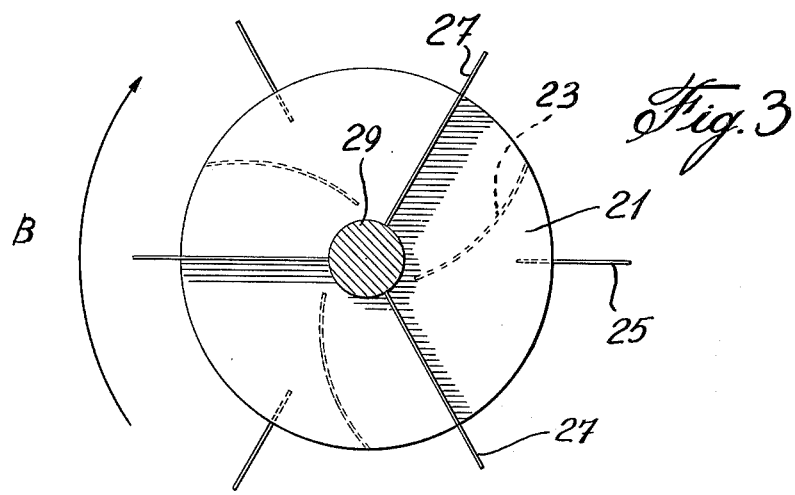
Figure 4:
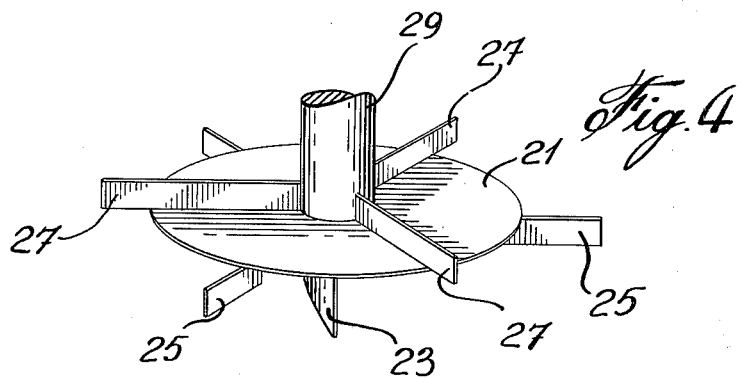
Figure 5:
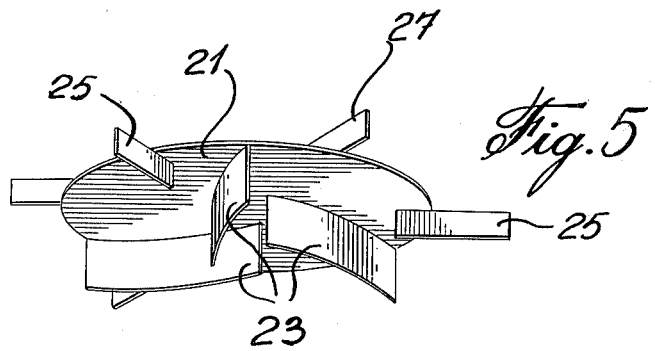

Other objects and a fuller understanding of the invention may be had by referring to the following description and claims, taken in conjunction with the accompanying drawings in which:

FIG. 1 is a cross-sectional elevation view of the apparatus according to the invention, FIG. 2 is a top view of the apparatus shown in FIG. 1, FIG. 3 is a top view of the aeration system of the aeration tank of the apparatus according to the invention, FIG. 4 is a perspective side view of the aeration system shown in FIG. 3, and FIG. 5 is a perspective bottom view of the aeration system shown in FIG. 3.

With reference to the drawings, the apparatus according to the invention is shown as being composed of an aeration tank 1 having a bottom 3 provided with a central opening 5.

The bottom 3 may have different forms. The form of the bottom is an important feature of the present invention and in the embodiment shown in FIG. 1 it has a central part in the form of a frustum of cone the inclined side 7 of which forms, in cross section, with adjacent inclined wall 8 of the aeration tank 1 a reversed chinese hat or umbrella shaped roof the top of which is directed downwardly. The bottom 3 may have also other forms such as a half parabola, a half hyperbola, a half torus or the like. In the embodiment shown in FIG. 1, the upturned part 7 of the frustum of cone bottom is important for directing the flow of water created by an aeration turbine, which will be described later, upwards towards the turbine according to arrows A for creating a good circulation of the sewage water inside the aeration tank 1 and for preventing organic particles from settling at the bottom of and passing into a clarification tank which will be described later.

Tank 1, which is tight, may have a cylindrical part and a frustum of a cone part as shown in FIG. 1.

Tank 1 is concentrically installed inside a second tank 9, called clarification tank 9, which may have the same form as the aeration tank 1, i.e., it may have a cylindrical part and a frustum of a cone part.

The bottom 3 of the aeration tank 1 forms with the bottom 4 of the clarification tank 9 a space which varies as a function of the size of the apparatus, the height of the tanks and the type of the used aeration turbine which will be described later.

Between aeration tank 1 and clarification tank 9 there is provided an annular space 11 the upper end of which is closed with a plate 13.

The form of the bottom 3 of the aeration tank is an important feature of the invention and prevents, when the aeration turbine stops operating, the ascention in the clarification tank 9, i.e., in the annular space 11, of light nondecantable particles which would have been driven towards the bottom of the aeration tank by the hydraulic movement or turmoil created by the aerator turbine. In fact, due to the form of bottom 3 of the apparatus of the present invention, these particles ascend by gravitation in the aeration tank 1 when the aeration turbine stops.

As above mentioned, an aerator in the form of an aeration turbine 15 is provided on the surface of the aeration tank 1. The turbine is supported on a floating member 17 and is driven by a motor 19 also supported by the floating member.

The structure of the aerator 15, which is an important feature of the present invention, permits the creation of a sufficient upwards suction, thus providing a homogenization, an aeration and a recirculation of the bath and the activated sludge contained in the aeration tank.

The turbine consists of a disc plate 21 (see FIGS. 3, 4 and 5), which is provided on its lower surface with curved blades 23, the curved blades being three in a number in the represented embodiment, the convex side of each curved blade being directed in the rotating direction (see arrow B, FIG. 3) of the turbine 15.

The curved blades 23 are placed at 120° from each other.

Three further blades 25, which are radial blades, are disposed on the same lower surface as the curved blades 23. The lower radial blades 25 are shifted or offset angularly forwardly with respect to the curved blades by 30° to 45°. The lower radial blades project outwardly beyond the perimeter of the disc plate 21.

Three further blades 27 are disposed on the upper surface of the disc plate 21 and are shifted angularly forwardly with respect to the lower curved blades by 60° to 75°. The upper radial blades 27 project also outwardly from the perimeter of the disc plate 21 and they stem from a central rotating axle 29 of the disc plate 21, whereas the lower curved blades and the lower radial blades start a certain distance away from the central axle 29 as clearly indicated in FIG. 3.

The lower curved blades 23 have as function to create a vortex permitting a slight suction of the decantable particles and a recirculation of the activated sludge of the clarification tank 9.

The lower radial blades 25 permit the creation of a violent turmoil in surface for aerating the bath contained in the aeration tank.

The upper radial blades 27 permit the stabilization of the above mentioned turmoil by laminating the hydraulic thin jets or streams created by the lower radial blades 25. The upper radial blades 27 also provide a regularity of sprays of water and an excellent aeration.

The plate 13 placed on the upper end of the clarification tank 3 is at the level of the bath contained in the aeration tank 1 and permits the trapping at the upper part of the clarification tank 9 of the fines, driven by microflotation during an eventual denitrification, or the like floating materials. The fines or the like particles which have a lesser density than the water raise upwards and are evacuated or discharged, from a series of nozzles 31 provided in plate 13, at every rising of the level of the aeration tank 1 due to the arrival in the aeration tank 1 of new sewage water for treatment by an inlet pipe 33. The number, the height and the diameter of nozzles 31 vary according to the quantity of the sewage water being introduced in the aeration tank.

Nozzles 31 slightly project above the level of the water contained in the aeration tank and are protected from a reverse circulation of the waves of water from the aeration tank towards the clarification tank during the operation of the aeration turbine by means of the floating member 17. Thus, the floating member 17 acts as a protection rampart against the turmoil created by the turbine 15.

The treated or purified water is discharged through an outlet 35 provided in the plate 13 and opening above the level of the water contained in the aeration tank every time that there is a new arrival of sewage water in the aeration tank 1 by the inlet 33.

In the embodiment shown in FIG. 1, the floating member 17 is circular and has a circular cross section and the motor 19 is placed on this platform by means of braces 37.

A space 39 is provided between the floating member 17 and the upper edge of the vertical wall of the aeration tank 1 in order to permit reintroduction of the fines evacuated by the nozzles 31 into the aeration tank 1 according to arrow C (FIG. 1).

Although the invention has been described with a certain degree of particularity, it is understood that the present disclosure has been made only by way of example and that numerous changes in the details of construction and the combination and arrangement of parts may be resorted to without departing from the scope of the invention as hereinafter claimed.

I claim:

1. Domestic sewage water treatment apparatus, comprising:
    a. an outer tank having inlet means and outlet means,
    b. an inner tank disposed within and spaced from said outer tank, the bottom of said inner tank being vertically displaced from the bottom of said outer tank,
    c. the bottom of said inner tank having an aperture therein and an upwardly directed means for preventing light particles from ascending into said outer tank,
    d. means provided at the top of said inner tank for creating a sufficient upwards suction providing homogenization, aeration and recirculation of a bath and of activated sludge contained in said inner tank,
    e. floating means provided at the top of said inner tank for acting as a protection rampart against turmoil created by the aeration, homogenization and recirculation means,
    f. means provided at the top of the space between the outer tank and the inner tank for trapping light floating materials collected at the top of said space and evacuating said floating materials from said top of said space.

2. Domestic sewage water treatment apparatus according to claim 1, wherein said outer tank is a clarification tank and said inner tank is an aeration tank and is concentrically installed within the clarification tank.

3. Domestic sewage water treatment apparatus according to claim 2, wherein the bottom of said inner tank has a cross section in the form of a half parabola and has a central opening, the bottom so shaped forming the means upwardly directed for preventing the light particles from ascending into the clarification tank.

4. Domestic sewage water treatment apparatus according to claim 2, wherein the bottom of said aeration tank has a cross section in the form of a half hyperbola and has a central opening, the bottom so shaped forming the means upwardly directed for preventing the light particles from ascending into the clarification tank.

5. Domestic sewage water treatment apparatus according to claim 2, wherein the bottom of said aeration tank has a cross section in the form of a semi torus and has a central opening, the bottom so shaped forming the means upwardly directed for preventing the light particles from ascending into the clarification tank.

6. Domestic sewage water treatment apparatus according to claim 2, wherein the bottom of said aeration tank has a cross section in the form of a reversed chinese hat, the top of which is directed downwardly, the bottom so shaped forming the means upwardly directed for preventing the light particles from ascending into the clarification tank.

7. Domestic sewage water treatment apparatus according to claim 2, wherein said means provided at the top of said inner tank for creating said upwards suction consist of an aerating turbine.

8. Domestic sewage water treatment apparatus according to claim 7, wherein said floating means consist of a circular member having a circular cross section.

9. Domestic sewage water treatment apparatus according to claim 8, wherein the aerating turbine is mounted on said floating member, the turbine being driven by a motor also mounted on said floating member.

10. Domestic sewage water treatment apparatus according to claim 9, wherein said means at the top of said clarification tank for trapping and evacuating the light floating materials consist of a plate closing the upper end of the space between the vertical wall of the inner and outer tanks, this plate being provided with nozzles projecting above the level of the water contained in the aeration tank for evacuating the light floating materials each time that there is a new arrival of sewage water into the aeration tank.

11. Domestic sewage water treatment apparatus according to claim 10, wherein there is a space provided between the floating member and the upper edge of the vertical wall of the aeration tank in order to permit the reintroduction of the light floating materials evacuated by the nozzles into the aeration tank.

12. Domestic sewage water treatment apparatus according to claim 10, further comprising an outlet for discharging purified water, said outlet being provided in said plate and opening above the level of the water contained in the aeration tank.

13. Domestic sewage water treatment apparatus according to claim 7, wherein said aeration turbine comprises a disc plate being provided on its lower surface with curved blades placed at 120° from each other, the curved blades creating a vortex permitting a slight suction of the decantable materials and a recirculation of the activated sludge of the clarification tank, said disc plate being further provided on its lower surface with radial blades forwardly offset with respect to the curved blades by 30° to 45°, these lower surface radial blades projecting beyond the perimeter of the disc plate and permitting the creation of a violent turmoil at the surface for aerating the bath contained in the aeration tank, the upper surface of the disc plate being provided with radial blades forwardly offset with respect to the curved blades by 60° to 75°, these upper surface radial blades also projecting beyond the perimeter of the disc plate and permitting the stabilization of the turmoil by a lamination of the hydraulic streams created by the lower surface radial blades.

14. Domestic sewage water treatment apparatus according to claim 13, wherein said lower surface curved blades are three in number, said lower surface radial blades are three in number and said upper surface radial blades are three in number.

15. Domestic sewage water treatment apparatus according to claim 14, wherein said upper surface radial blades stem from a central rotating axle and said lower surface curved blades and said lower surface radial blades start a predetermined distance away from the central axle.

* * * * *